United States Patent [19]

Wang

[11] Patent Number: 5,334,976

[45] Date of Patent: Aug. 2, 1994

[54] KEYBOARD WITH FINGER-ACTUABLE AND STYLUS-ACTUABLE KEYS

[75] Inventor: An Wang, Lincoln, Mass.

[73] Assignee: Wang Laboratories, Inc., Lowell, Mass.

[21] Appl. No.: 551,673

[22] Filed: Jul. 11, 1990

Related U.S. Application Data

[63] Continuation of Ser. No. 290,220, Dec. 27, 1988, abandoned.

[51] Int. Cl.$^5$ .......................................... H03K 17/967
[52] U.S. Cl. .................................... 341/22; 400/479; 345/179
[58] Field of Search .................. 340/706–708, 340/711, 712; 400/472, 479, 485, 486, 488, 489; 364/709.12; 341/20, 22; 178/17 C; 379/368; 345/179, 168

[56] References Cited

U.S. PATENT DOCUMENTS

| | | | |
|---|---|---|---|
| D. 271,767 | 12/1983 | Ohie | D14/100 |
| D. 279,190 | 6/1985 | Tsumura et al. | D14/100 |
| D. 285,793 | 9/1986 | Moggaridge | D14/100 |
| D. 293,244 | 12/1987 | Chu et al. | D14/100 |
| D. 293,911 | 1/1988 | Lynar et al. | D14/100 |
| 3,731,299 | 5/1973 | Bouchard et al. | |
| 4,405,921 | 9/1983 | Mukaiyama | 340/208 |
| 4,443,789 | 4/1984 | Enfield et al. | 400/486 |
| 4,451,895 | 5/1984 | Sliwkowski | 340/208 |
| 4,483,634 | 11/1984 | Frey et al. | 400/489 |
| 4,597,681 | 7/1986 | Hodges | 400/489 X |
| 4,698,618 | 10/1987 | Liuzzo et al. | 341/22 |
| 4,823,294 | 4/1989 | Rouhani | 364/709.12 |
| 4,824,268 | 4/1989 | Diernisse | 400/486 |

FOREIGN PATENT DOCUMENTS

0130051 1/1985 European Pat. Off. ............ 400/489

OTHER PUBLICATIONS

Patent Abstracts of Japan, vol. 007, No. 035 (P-175) Feb. 10, 1983, & JP-A-57 187 735 (Sharp KK), Nov. 18, 1982.

American National Standard for Human Factors Engineering of Visual Display Terminal Workstations, ANSI/HFS 100-1988, publ. by the Human Factors Society, Inc. Jun. 10, 1988 pp. 35–42.

Ergonomics Recommendations for VDU Work Places, TR/22, ECMA-European Computer Manufacturers' Assocation, Mar., 1984.

*Primary Examiner*—Michael Horabik
*Attorney, Agent, or Firm*—Kenneth L. Milik

[57] ABSTRACT

A keyboard having a conventional set of alphanumeric keys and special function keys which are actuable by an operator using a finger and a stylus. The stylus-actuable keys have keypad areas which are less than a prescribed range of areas. Other keys which have keypads greater in area than a value in the prescribed range are designed for keystroke operation by the operator's finger. Alternatively, the stylus-actuable keys have center line spacings which are less than a value from a predetermined range of lineal dimensions, while the finger-actuable keys have center line spacings which are greater in value than a value in the predetermined range. Having been derived from human factors considerations which have been defined for finger-actuable keys, the prescribed range of areas is preferably 100 square millimeters to 162 squares millimeters and the predetermined range of dimensions is preferably 12 millimeters to 21 millimeters. As a result, the footprint is smaller than that for a standard sized keyboard while maintaining substantially the same key stroke procedures of a conventionally-sized PC keyboard. Being suitable for use with a graphical tablet, another embodiment is made with keys mounted to a surface which is angled between 30 degrees and 90 degrees from the horizontal plane of a desktop. In an effort to reduce manufacturing costs, the preferred embodiment is made with membrane type switches using conventional touch panel technology.

2 Claims, 3 Drawing Sheets

KEYBOARD WITH FINGER-ACTUABLE AND STYLUS-ACTUABLE KEYS

This is a continuation of copending application Ser. No. 07/290,220 filed on Dec. 27, 1988 now abandoned.

BACKGROUND OF THE INVENTION

This invention relates to keyboards used by an operator for controlling and interacting with a computer, and more specifically, to layouts of keys in desktop keyboards for entering desired inputs to a processor.

Being a desktop product, a conventional personal computer (PC) typically comprises an enclosure which houses electronic boards containing one or more of the main microprocessor chips, a video display terminal (VDT) and a keyboard. Standard keyboards provided with PC products from such manufacturers as IBM and Wang Laboratories, INC. (WLI) have alphanumeric keys which are sized for use by one or more fingers of an operator (PC user). As is well known, the layout of the alphabetical keys is in the so-called QWERTY format which was developed for the typewriter. This arrangement permits relatively fast generation of inputs by many operators, especially those who have ten-finger touch typing skills. However, the finger-actuable keys have certain minimum keypad dimensions which are consistent with human factors design considerations so that the standard keyboard generally has a certain overall size or footprint on the desktop.

With the inclusion and popularity of other interface devices such as a tablet for providing graphical inputs to a PC, the operator's desk becomes more crowded and desktop space becomes very important. For those applications where use of the graphical tablet predominates, a smaller keyboard is very desirable.

Although small alphanumeric keyboards have existed for hand-held programmable calculators, those designs have not been widely adapted for PC use. Having a full set of alphabetic and numeric keys, the keyboards for such calculators typically have very small keypad areas because each calculator is designed to be comfortably held by one hand while the other hand is used for keystroking. There are other calculators with keys so small that a stylus such as a pen is used for key actuation because the operator's finger is to broad for accurate key selection. In other words, the keys are so close together that keystroking by one finger is difficult without making erroneous and unwanted multiple actuations of nearby keys.

Programmable and other calculators are arranged so that key actuations must be made one after another in a sequential order only. This arrangement avoids the problems attendant with generating commands and inputs that require simultaneous keystrokes of two or more small keys. As a result, these calculators typically have the letter keys in alphabetical order and not in the QWERTY order for ease of operator selection. However, strictly sequential keystroking is not desirable for PC products because it would require a change of the habits and training of many operators. Specifically, it is well known that generating capital letters or special function commands can be accomplished by actuating the conventional SHIFT key simultaneously with an alphabetical or other key, respectively. For two-handed keystroking, such SHIFT key use is well accepted because many operators use touch typing techniques borrowed from standard typewriter procedures.

In addition, there are other well known PC commands which require more than two simultaneous keystrokes. The so-called warm restart command is an example of a triple simultaneous keystroke procedure. In the IBM PC product, that command is generated by the simultaneous actuation of the CONTROL, ALTERNATE and DELETE keys. In the WLI PC product, that command is produced by keystroking simultaneously the 2nd (or ALTERNATE), COMMAND and CANCEL keys.

Accordingly, there is a need for an improved PC keyboard which has a smaller footprint than standard keyboards in order to reduce the amount space used on a desktop. Moreover, the improved keyboard should offer the same general keystroke procedure and functions as those used for standard PC keyboards and typewriters.

SUMMARY

The above-mentioned disadvantages of standard PC keyboards as well as hand-held programmable calculator keyboards are overcome by the provision of a new and improved keyboard made in accordance with the teachings of the present invention. In a preferred embodiment of the invention, two design criteria are used for sizing the keypads. One criterion is for keys to be actuated with one or more of the operator's fingers. These keypads have surface areas which are greater than or equal to a value from a prescribed range of values based upon conventional human factors recommendations for finger-sized keys. Preferably, the prescribed range is 100 square millimeters (0.16 square inches) to 162 square millimeters (0.25 square inches). The majority of other keys in the present invention are smaller than the finger-sized set of keys. These other keys have keypad areas which are less in value than a value from the prescribed range and are intended to be actuated by the operator using a stylus. As a result, the keyboard having the combination of finger-actuable and stylus-actuable keys can be made with a smaller footprint than that for the standard PC keyboard.

The finger-sized keys are preferably suited for being the aforementioned SHIFT, CONTROL, ALTERNATE, 2nd, COMMAND and Cancel keys. This arrangement permits conventional two-handed double and triple simultaneous keystrokes for generating certain desired inputs and commands. The operator uses as needed a combination of one or more fingers of one hand with a stylus held in the other.

In an another embodiment of the present invention, the keys are in an array such that at least one finger-actuable key is located with a first center-to-center dimension from a second stylus-actuable key, and at least that second key is located with a second center-to-center dimension from a third key. The first center-to-center dimension is greater than or equal to a value from a predetermined range of values. The second dimension is less than a value from the predetermined range of values. Being determined by conventional human factors specifications for minimum spacings between finger-actuated keys, the predetermined range of values is preferably between 12 millimeters (0.47 inch) and 21 millimeters (0.83 inch). The center-to-center dimension is measured either horizontally or vertically with respect to each of the keys in the array.

In still another embodiment of the present invention, the keyboard face wherein keys are mounted is disposed at an angle which is measured with respect to the plane of the desktop and which is in the range between 30 degrees and 90 degrees. This arrangement further reduces the overall footprint of the keyboard and is particularly suited for being placed against the top edge of a graphical tablet.

BRIEF DESCRIPTION OF THE DRAWINGS

In each and all of the appended drawings, the same reference numeral refers to the same element.

In the following description, the dimensions of millimeters, square millimeters, inches and square inches may be abbreviated respectively as mm, sq mm, in and sq in. Moreover, dimensions have tolerances of plus or minus one millimeter and one square millimeter, respectively.

DETAILED DESCRIPTION OF THE PREFERRED EMBODIMENTS

Figure 1:
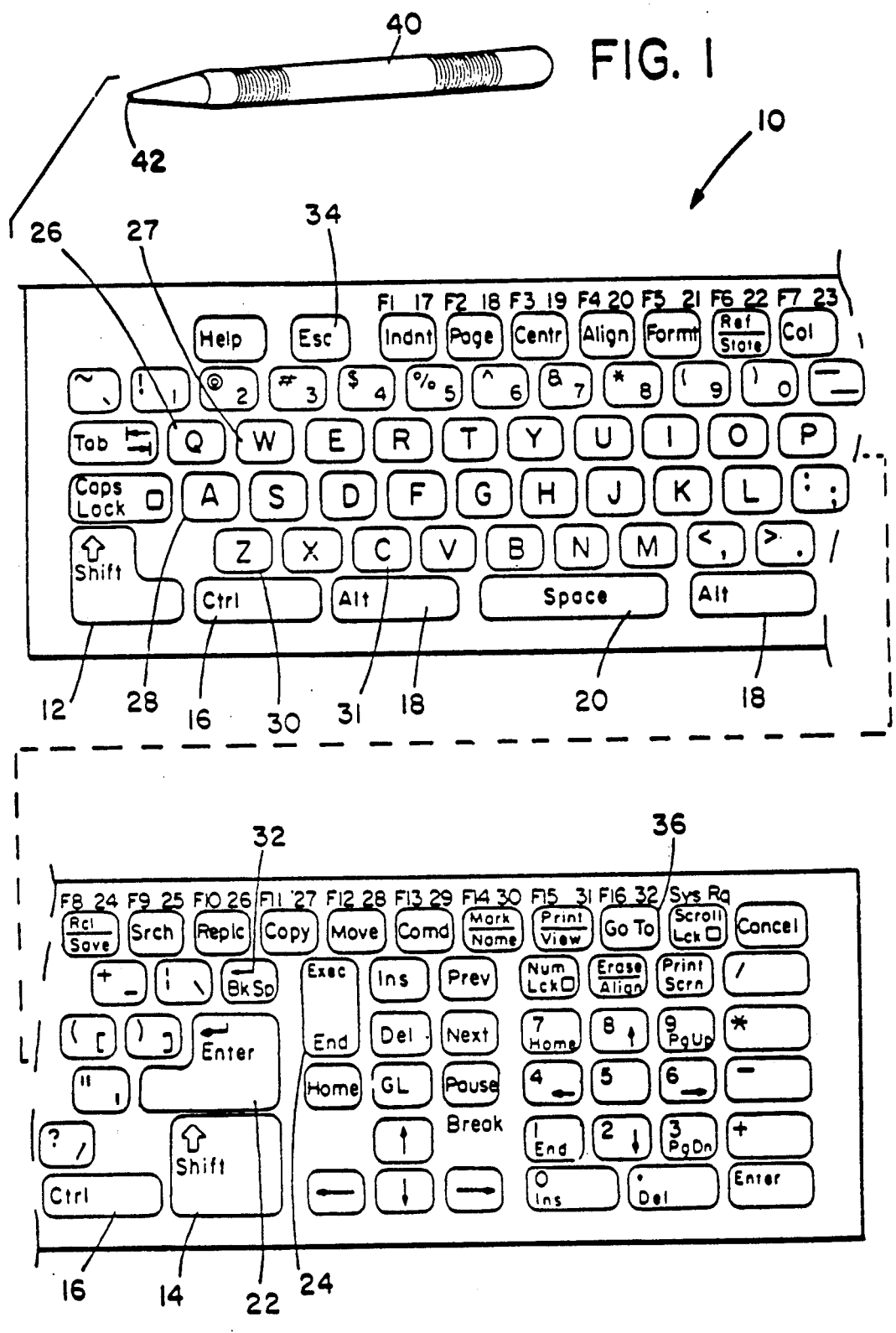
FIG. 1 depicts a keyboard layout incorporating the teachings of the present invention.

Depicted in FIG. 1 is a layout 10 of a keyboard which is made in accordance with the teachings of the present invention. The alphabetical, numerical and special function keys are the same as those on standard keyboards provided with prior art PC products made by IBM and WLI. Being collectively designated as finger-sized keys, Shift keys 12 and 14, Ctrl (Control) key 16, Alt (Alternate) key 18, Space key 20, Enter (also known as Return) key 22 and Exec (Execute)/End key 24, all have keypad surfaces sized for actuation by an operator's finger. It should be understood that the keypad surface of any key is the upper surface area where an operator (keyboard user) presses for actuating that key and generating the selected input to the microprocessor. The surface area of each keypad of the finger-sized keys in the present invention has a value at least greater than or equal to a value in the range between 100 square millimeters (0.16 square inches) and 162 square millimeters (0.25 square inches). This area range is in conformance with conventional human factors recommendations, which will be discussed in a later portion of this section, for keypads to be actuated by the operator's finger. It is also consistent with the minimum keypad area for keys on the standard IBM or WLI keyboards.

As further explanation of the above, the majority of the keys in the standard PC keyboard has a surface area of 161.3 square millimeters (0.25 square inches). In addition, these keys are square in shape with lineal dimensions of 12.7 millimeters (0.5 inch) for the sides. The keys are typically identified as being the alphanumeric, cursor control and most of the special function keys.

Moreover, each of these square keys is spaced at a minimum center-to-center distance of 19 millimeters (0.75 inch), which is measured horizontally from the center of one key to the vertical line passing through the center of an adjacent key. The center-to-center dimension measured vertically from the center of one key to the horizontal line passing through the center of an adjacent key is also 19 millimeters (0.75 inch). There are larger spacings to accommodate the larger keys such as the SPACE, ENTER (or RETURN), TAB, and SHIFT keys.

In the standard keyboard, a separate and duplicate array of numbers is usually provided in addition to the alpha-numerical set of keys that are in the QWERTY format. As a result, the typical overall footprint dimensions of the standard keyboards are 457.2 millimeters (18 inches) in length and between 177.8 mm (7 in) to 203.2 mm (8 in) in width.

The minimum keypad areas and center-to-center dimensions for the finger-actuable keys in the standard keyboard are also described in two human factors publications regarding recommendations for VDT workstations and for devices used in visual display unit (VDU) work places. In a treatise entitled, "American National Standard for Human Factors Engineering of Visual Display Terminal Workstations," published by The Human Factors Society, Inc., on Feb. 4, 1988, there is a specification in Sections 7.7 and 7.8 of Page 38 that the minimum horizontal strike surface width for a key should be 12 millimeters (0.47 inch). Additionally, the center line distance between adjacent keys should be between 18 millimeters (0.71 inch) and 19 millimeters (0.75 inch) horizontally. Furthermore, the vertical center line distance between adjacent keys should be between 18 millimeters (0.71 inch) and 21 millimeters (0.83 inch).

In the publication produced by the European Computer Manufacturers Association (ECMA) entitled, "Ergonomics Recommendations for VDU Work Places," dated March 1984, key dimensions and specifications are given in page 21. For a square-topped alphanumeric key, the dimension for each side should be between 12 millimeters (0.47 inch) and 15 millimeters (0.59 inch). If the keypad is not square, then the area should be at least 100 square millimeters (0.16 square inches). The center-to-center distance between keys should be 19 millimeters (0.75 inch) with a tolerance of plus or minus 1 millimeter (0.04 inch).

With reference back to FIG. 1, other keys, such as alphabet keys 26, 27, 28, 30 and 31, Bk Sp (Back Space) key 32, Esc (Escape) key 34 and Go To key 36, all have keypad surfaces which are smaller than the previously mentioned finger-sized keys. These other keys are known as stylus-actuable keys and are intended for actuation by the operator using a conventional stylus 40. The tip 42 of the stylus 40 is pointed with a spherical radius that is less than that for a typical human finger tip. The diameter and length of the stylus is only that which is required so that the stylus 40 can be comfortably grasped by the operator for use in actuating a selected key.

In the preferred embodiment of the present invention, some of the finger-actuable keys have minimum center-to-center spacings with respect to adjacent keys. The horizontal center-to-center dimensions between the Shift keys 12 and 14 and the Ctrl key 16, and the Ctrl key 16 and the Alt key 18, are at least greater than a value between the range of 12 mm (0.47 in) and 19 mm (0.75 in). The vertical center-to-center dimension between the finger-actuable Shift key 14 and the Enter key 22 is at least greater than a value between the range of 18 mm (0.71 in) and 21 mm (0.83 in). Both of the horizontal and vertical ranges of center-to-center dimensions conform to the aforementioned human factors recommendations.

It should also be explained that even though there may be a conflict between the minimum keypad area recommendation and the minimum center-to-center dimensions for finger-actuable keys, so long as one of the criteria is satisfied, the other can be relaxed. In one actual working embodiment of the present invention, the Ctrl key 16 and the Alt key 18 are preferably spaced at 9.5 millimeters (0.375 inch) respectively from the alphabet keys 30 and 31 and the keypad areas of the Ctrl key 16 and the Alt key 18 are both nominally 192.6 square millimeters (0.30 square inches). Being greater than the minimum 100 square millimeters, the Ctrl and Alt keys are thus finger-actuable keys. By relaxing one of the criteria, the resulting keyboard layout may be more densely arranged and thus smaller in footprint than the keyboard having all criteria satisfied.

If the keypad area is less than the minimum of 100 sq mm, that key can still be used as a finger-actuable key if the minimum center-to-center dimensions are met. In other words, even though the keypad area may be small, the proper separation between adjacent keys provides a buffer area so that accurate finger actuation is still possible. For example, if the keypad area of the Esc key 34 were less than 100 sq mm (0.16 sq in), it could be a finger-actuable key if either the horizontal or vertical center-to-center dimensions to the adjacent keys were greater than 12 mm (0.47 in) and 18 mm (0.71 in) respectively.

Figure 2:
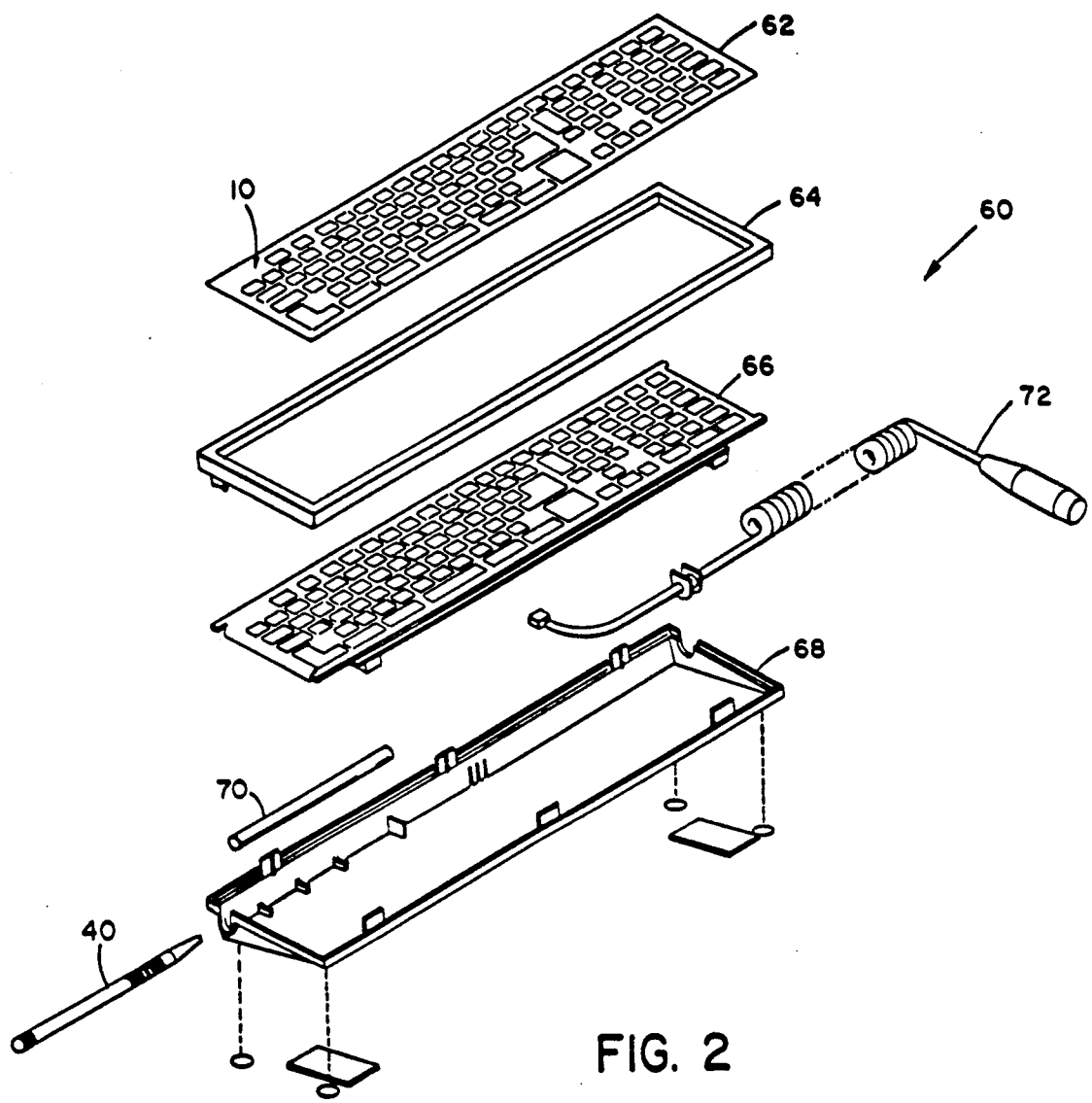
FIG. 2 is an exploded view of one embodiment of the present invention wherein the major components of a keyboard assembly are made with conventional touch panel technology.

FIG. 2 depicts in an exploded view the major components of the keyboard assembly 60 which includes the teachings of the present invention and which preferably incorporates conventional touch panel technology. This technology is well known and used in the TCE434 Series of IBM PC and PC-AT Plug Compatible Touch Panel keyboards made by the MICRO SWITCH Division of Honeywell, Inc. Further details of that keyboard and the associated touch panel technology are given in various publications 84-06867-0 786, 84-06831-0 583, 84-06812-0 483, 84-06811-A 483, 84-06813-0 483, 84-06851-0 884 and 84-06851-2 884 printed for and available from the MICRO SWITCH and Keyboard Divisions of Honeywell. Besides providing protection from many adverse ambient conditions which may exist, touch panel technology is also cheaper than keyboards made with so-called full-travel switches.

As shown in FIG. 2, a cover membrane sheet 62 has imprinted thereon the key layout 10 and is held in place by a peripheral frame 64 over a switch circuit board 66 which is mounted to an enclosure case 68. Also provided in the case 68 is a sheath 70, which is preferably a plastic tube, for storing the stylus 40 within the case. A conventional cable 72 is provided for connecting the keyboard assembly 60 to the rest of the PC equipment. One of the advantages of using the imprinted membrane sheet 62 is the ease with which it can be replaced by another sheet, such as one imprinted with foreign language legends. Moreover, if the proper number of switches are provided in the underlying switch circuit board 66, the United States version of the keyboard can be easily changed to the somewhat different international version by replacing the US layout membrane sheet with the sheet imprinted with the international layout.

Figure 3:
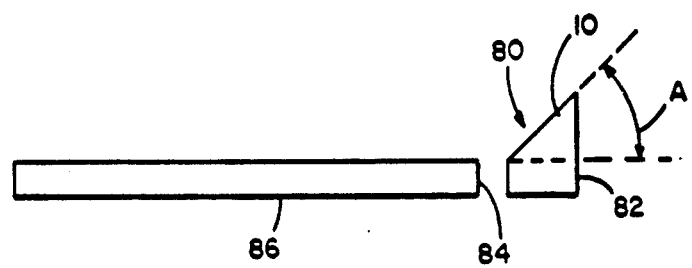
FIG. 3 depicts an elevation view of another embodiment of the present invention wherein the keyboard is sloped with a relatively large angle.
Figure 4A:
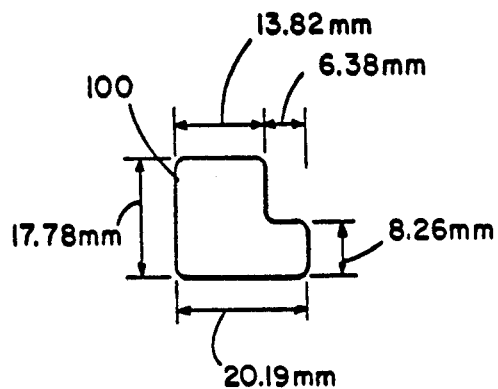
FIGS. 4a–4g presents the nominal dimensions of the keys shown in FIG. 1.
Figure 4B:
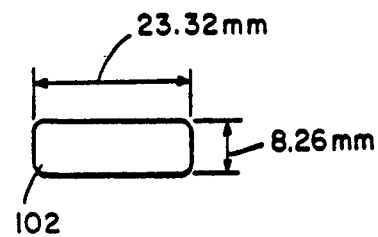
Figure 4C:
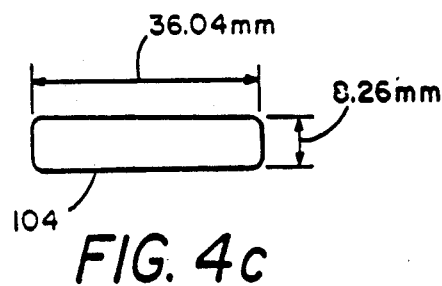
Figure 4D:
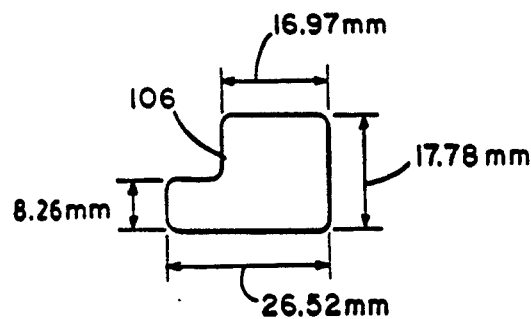
Figure 4E:
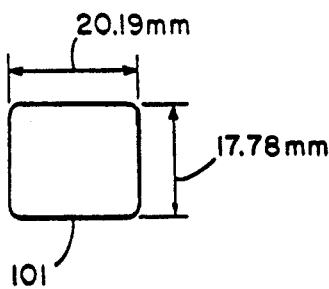
Figure 4F:
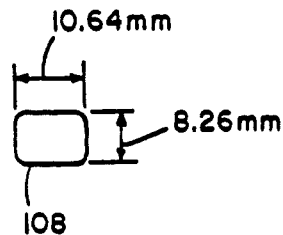
Figure 4G:
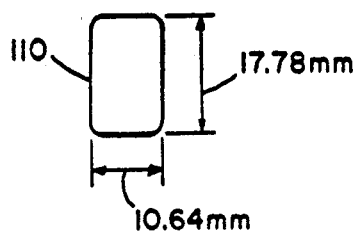

FIG. 3 shows an elevation view of an angled keyboard assembly 80 which is another embodiment of the present invention wherein the case 68 depicted in FIG. 2 is replaced by a modified case 82 which presents the key layout 10 at an angle A with respect to a horizontal plane of a desktop. For the standard PC keyboards, angle A is typically less than 15 degrees. In the previously mentioned publication by The Human Factors Society, Inc., there is a recommendation in Section 7, page 37, that the keyboard slope be in the range between 0 and 25 degrees.

Having the angle A in the range between 30 and 90 degrees, the keyboard assembly 80 is placed near a front surface 84 of a conventional graphical tablet 86. This combination has a smaller overall footprint on the desktop than the tablet combination with either the standard PC keyboard or the present invention with the angle A being less than 30 degrees.

In a specific working embodiment of the present invention, the overall footprint dimensions of the case 68 are 312.4 mm (12.3 in) long by 76.2 mm (3.0 in) wide. The keyboard face is angled to be 12 degrees, but two short legs (not shown in the drawings) can be inserted into the bottom of the case 68 so that the keyboard angle is 0.0 degrees with respect to the desktop. The switch circuit board 66 contains at least 111 switches so that 110 keys can be provided for the US keyboard version (shown in FIG. 1) and 111 keys can be provided for the International keyboard version when the associated membrane sheet 62 is inserted into the peripheral frame 64. Since the two versions have three keys in different locations, more switches are provided than for a keyboard that cannot be converted from one version to another. The stylus 40 is 127 mm (5 in) long including the tapered portion which is 17.5 mm (0.69 in) long, the stylus diameter is 6.6 mm (0.26 in) and the tip 42 has a spherical radius of 0.76 mm (0.30 in).

As depicted in FIG. 4, the nominal dimensions of the keypads for the Shift keys 12 and 14 are respectively presented in keys 100 and 101, Ctrl key 16 and Alt key 18 are presented in key 102, the Space key 20 is presented in key 104, the Enter key 22 is presented in key 106, the alphabet keys 26, 27, 28, 30, and 31, the Esc key 34, Bk Sp key 32 and Go To key 36 are presented in key 108, and the Exec/End key 24 is presented in key 110. Furthermore, the vertical distances between the four horizontal lines which pass through the centers of alphabet keys 26, 28 and 30, Ctrl key 16, Alt key 18, and Space key 20 are all 9.53 mm (0.375 in). The respective horizontal distances between vertical lines passing through alphabet keys 26, 28 and 30 are 3.20 mm (0.126 in) and 6.35 mm (0.25 in). The distance between vertical lines passing through the centers of Shift key 12 and Ctrl key 16 is 23.80 mm (0.937 in).

While the invention has been described with reference to specific improvements, it will be apparent that improvements and modifications may be made within the purview of the invention without departing from the spirit and scope thereof as defined in the appended claims. For example, even though touch panel technology is disclosed to be the best mode of the present invention in view of the manufacturing costs, standard full travel switches can be used.

What is claimed is:

1. A keyboard having keys for actuation by an operator for communicating to a processor, said keyboard comprising:
   a set of alphanumeric keys arranged in a QWERTY format for generating desired inputs to be transmitted to the processor;
   each of said set of alphanumeric keys being a first key, each having the surface area dimension less than a value from a prescribed range of values; and a plurality of second keys, each having the surface dimension greater than or equal to a value from said prescribed range of values;

said surface area dimension being defined as the region where key actuation by the operator can be effected, and said prescribed range of values being defined as those values which are suited for key activation by the operator when using a finger;

said keys being mounted in a flat keyboard face which is disposed at an angle with respect to a horizontal plane of a desktop; said angle being in the range between 30 degrees and 90 degrees.

2. A keyboard having keys for actuation by an operator for communicating to a processor, said keyboard comprising:

a set of alphanumeric keys arranged in a QWERTY format for generating desired inputs to be transmitted to the processor, each of said set of alphanumeric keys being a first key, each having a surface area dimension less than a value from a prescribed range of values;

a plurality of second keys, each having the surface dimension greater than or equal to a value from said prescribed range of values;

said surface area dimension being defined as the region where key actuation by the operator can be effected, and said prescribed range of values being defined as those values which are suited for key activation by the operator when using a finger;

at least one of said first keys being spaced with a first center-to-center dimension from an adjacent first key, and at least one second key being spaced with a second center-to-center dimension from a second key, wherein said second center-to-center dimension is at least greater than or equal to a value from said prescribed range of values, and said first center-to-center dimension is less than a value from said range, said first and second dimensions being measured either horizontally or vertically with respect to said set of keys;

a stylus means for actuating a first key, wherein said operator actuates said first key when desired by using the stylus means and actuates said second key when desired with the operator's finger; and a plurality of third keys, each key spaced with said first center-to-center dimension from an adjacent key of said plurality of third keys, each of said third keys being actuable simultaneously with said first and second keys for generating the desired input, all of said keys being mounted in a flat keyboard face which is disposed at an angle with respect to a horizontal plane of a desktop; said angle being in the range between 30 degrees and 90 degrees.

* * * * *